United States Patent
Huang et al.

(10) Patent No.: US 9,158,911 B2
(45) Date of Patent: Oct. 13, 2015

(54) PASSWORD MANAGEMENT SYSTEM AND METHOD FOR ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yong-Long Huang, Shenzhen (CN); Shou-Feng Fan, Shenzhen (CN); Huan-Huan Zhang, Shenzhen (CN); Xin Lu, Shenzhen (CN); Ying-He Zhao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 134 days.

(21) Appl. No.: 13/899,612

(22) Filed: May 22, 2013

(65) Prior Publication Data

US 2013/0318596 A1    Nov. 28, 2013

(30) Foreign Application Priority Data

May 23, 2012   (CN) .......................... 2012 1 0161890

(51) Int. Cl.
G06F 21/46    (2013.01)
H04W 12/06    (2009.01)

(52) U.S. Cl.
CPC ............... *G06F 21/46* (2013.01); *H04W 12/06* (2013.01); *G06F 2221/2111* (2013.01)

(58) Field of Classification Search
CPC . G06F 21/46; G06F 2221/2111; H04W 12/06
USPC .......................................................... 726/18
See application file for complete search history.

(56) References Cited

U.S. PATENT DOCUMENTS

| | | | |
|---|---|---|---|
| 2003/0048174 A1* | 3/2003 | Stevens et al. ................ | 340/5.64 |
| 2006/0112283 A1* | 5/2006 | Eldridge et al. ............... | 713/193 |
| 2007/0143824 A1* | 6/2007 | Shahbazi ........................... | 726/1 |
| 2009/0100530 A1* | 4/2009 | Chen ............................... | 726/29 |
| 2009/0135002 A1* | 5/2009 | Blinnikka et al. ........ | 340/539.13 |
| 2010/0251358 A1* | 9/2010 | Kobayashi et al. ............. | 726/18 |
| 2011/0034211 A1* | 2/2011 | Li .................................. | 455/558 |

* cited by examiner

*Primary Examiner* — Dao Ho
(74) *Attorney, Agent, or Firm* — Novak Druce Connolly Bove + Quigg LLP

(57) ABSTRACT

A computerized method manages passwords to unlock an electronic device from a standby mode by taking changed GPS coordinates of a location of the electronic device and utilizing the changed coordinates in preset formulas to establish and require a new password in substitution for a current password, to allow unlocking of the electronic device.

14 Claims, 2 Drawing Sheets

PASSWORD MANAGEMENT SYSTEM AND METHOD FOR ELECTRONIC DEVICE

BACKGROUND

1. Technical Field

Embodiments of the present disclosure relate to data security, and particularly to a management system and method for unlocking an electronic device using a password.

2. Description of Related Art

For data security, many people lock an electronic device into a standby mode. When a user wants to use the electronic device again, a valid password is inputted to unlock the electronic device. However, the password may become known to others. For example, the password may be learned by other people during the unlocking process of the electronic device. Thus, personal data stored in the electronic device may be accessed by unauthorized individuals, and the user may experience unexpected difficulties. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
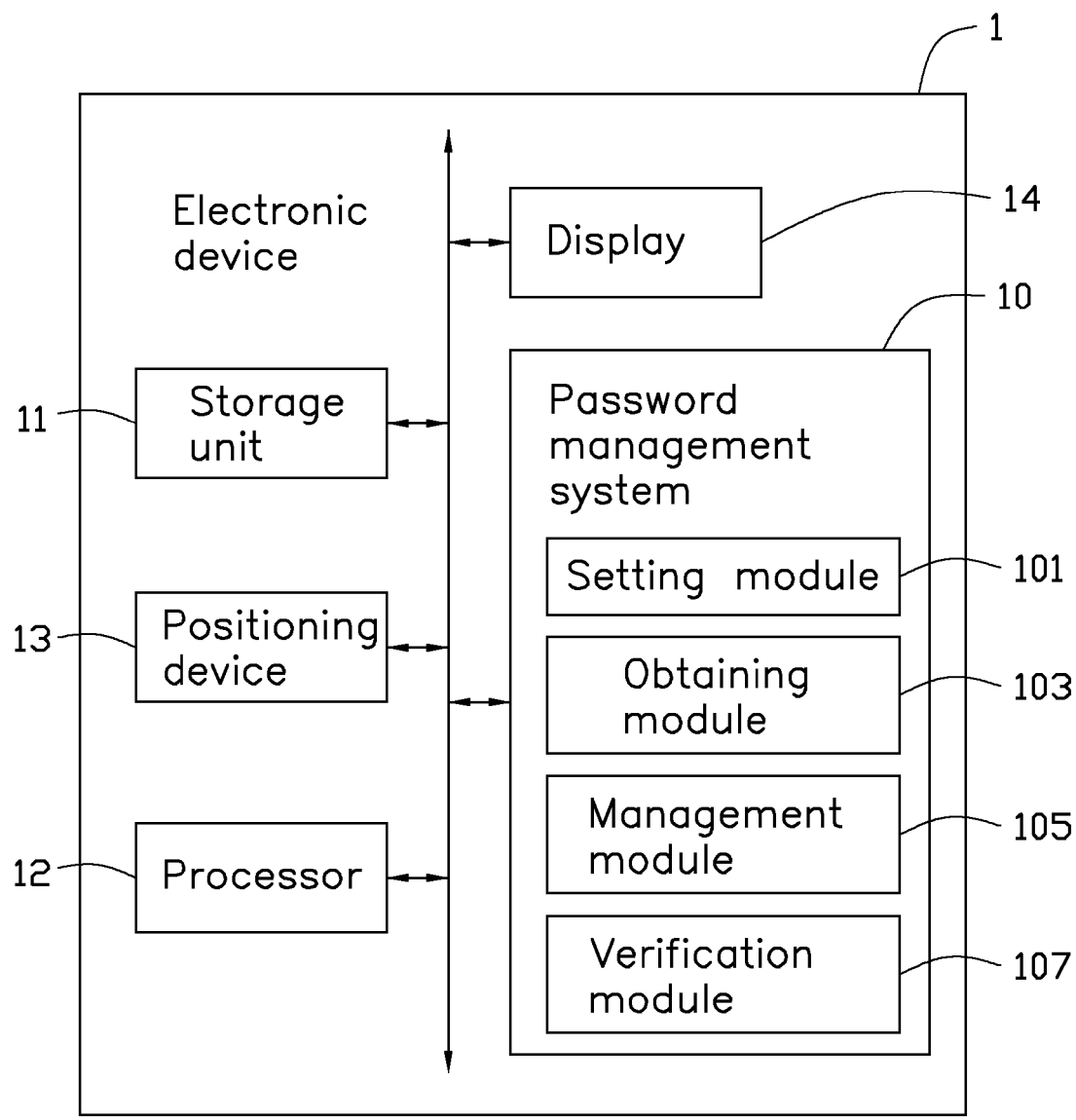
FIG. 1 is a schematic block diagram illustrating one embodiment of an electronic device including a password management system.

FIG. 1 is a schematic block diagram illustrating one embodiment of an electronic device 1 including a password management system 10. The electronic device 1 further includes a storage unit 11, at least one processor 12, a positioning device 13, and a display 14. In one embodiment, the electronic device 1 may be, for example, a tablet computer, a smartphone, a personal digital assistant, or similar device. FIG. 1 shows only one example of the electronic device 1, and the electronic device 1 can include more or fewer components than those shown in the embodiment, or have a different configuration of the components.

The positioning device 13 may be a global positioning system (GPS) device, for example. The positioning device 13 is capable of locating a position of the electronic device 1, and obtaining coordinates of the position. In the embodiment, the positional coordinates include, for example, a longitude data and a latitude data of the position of the electronic device 1. The positional coordinates may be established as two dimensional coordinates within a predetermined two dimensional coordinate system, such as a Cartesian coordinate system. In an alternative embodiment, the positional coordinates may be established as three dimensional coordinates within a predetermined three dimensional coordinate system, such as a spherical coordinate system or a geodetic coordinate system.

The password management system 10 may include a plurality of programs in the form of one or more computerized instructions stored in the storage unit 11 and executed by the processor 12 to perform operations of the electronic device 1. In the embodiment, the password management system 10 includes a setting module 101, an obtaining module 103, a management module 105, and a verification module 107. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The setting module 101 sets one or more formulas for generating dynamic passwords to unlock the electronic device 1, and writes the one or more formulas into a configuration file prestored in the storage unit 11. In the embodiment, the positional coordinates of the electronic device 1 are used as reference variables by the one or more formulas for generating different passwords. A correct password unlocks the electronic device 1 when the electronic device 1 is in a standby mode. In the embodiment, the standby mode refers to a low power mode for the electronic device 1 when the display 14 is locked.

In the embodiment, the one or more formulas are preset by a user of the electronic device 1. In an example, one formula may be, for example, $f(x)=(y+2)(x+6)$, $f(x)=xy$, $f(x)=mnx59$, or $f(x)=8(x+5)7y$, where x and y are reference variables of the formula. The x and y variables respectively represent the longitude data and the latitude data of the positional coordinates of the electronic device 1, and $f(x)$ represents a password for unlocking the electronic device 1. Accordingly, the password is determined according to the positional coordinates of the electronic device 1.

The obtaining module 103 obtains current positional coordinates of the electronic device 1 from the positioning device 13 and displays the current positional coordinates of the electronic device 1 on the display 14.

The management module 105 determines whether a position of the electronic device 1 changes, and generates a new password using the one or more formulas according to the current positional coordinates of the electronic device 1 when the position of the electronic device 1 changes, so replacing a previous password of the electronic device 1. In the embodiment, the management module 105 stores the new password in the storage unit 11, and deletes the previous password from the storage unit 11 as a replacement for the previous password.

In detail, the management module 105 compares the current positional coordinates of the electronic device 1 with previous positional coordinates of the electronic device 1, and determines whether the position of the electronic device 1 changes according to the comparison. The previous password of the electronic device 1 is kept and not deleted if the current positional coordinates of the electronic device 1 are identical with the previous positional coordinates of the electronic device 1. The management module 105 may be activated at regular intervals, or in real-time, or when the user activates the electronic device 1 out of the standby mode.

The verification module 107 verifies whether a password input by a user matches a current password stored in the storage unit 11 of the electronic device 1, and unlocks the electronic device 1 when the password input by the user matches the current password. Otherwise, the electronic device 1 is kept locked (e.g., kept in the standby mode) when the password input by the user does not match the current password. When the new password is generated, the new password becomes the current password of the electronic device 1. Until a next new and different password is generated, the current password of the electronic device 1 remains valid.

In addition, when the password input by the user does not match the current password of the electronic device 1, the verification module 107 counts a number of times that the user inputs an incorrect password within a first predetermined time period, and then prevents the electronic device 1 from being unlocked within a second predetermined time period when the counted number of times exceeds a predetermined number of attempts, such as three or five attempts.

When the user wants to unlock the electronic device 1 in the standby mode, the user inputs the correct password according to the positional coordinates displayed on the display 14 in real-time or at intervals and the one or more formulas preset by the user. After the electronic device 1 has been unlocked, the user can modify the one or more formulas.

Since the password management system 10 is capable of dynamically changing the password of the electronic device 1 according to different locations of the electronic device 1, even though the previous password might have been noticed by other people, the electronic device 1 cannot be unlocked using an old password when the device is in a different location and the password is thus changed. Accordingly, data security of the electronic device 1 is improved.

Figure 2:
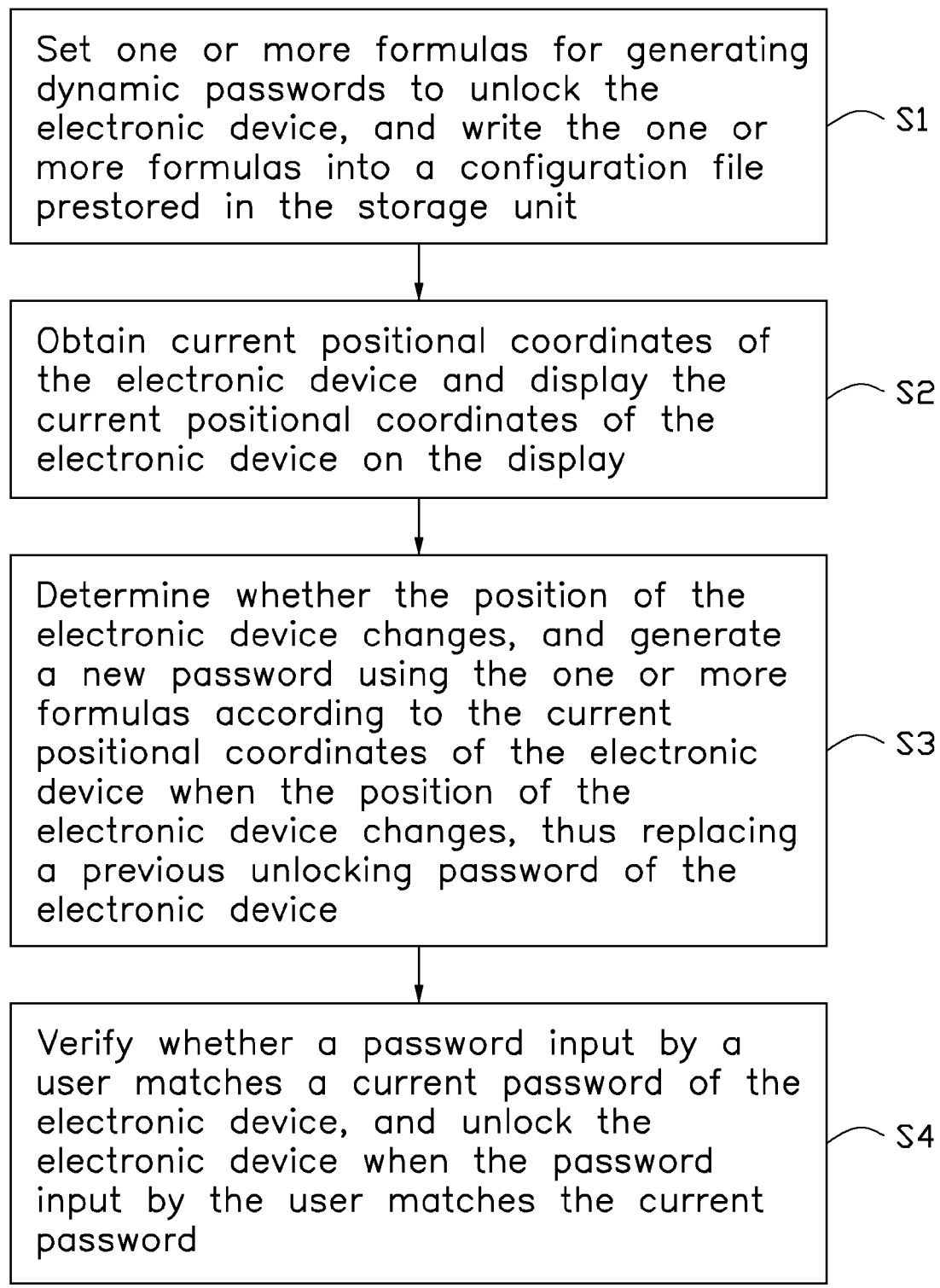
FIG. 2 is a flowchart of one embodiment showing a management method for unlocking the electronic device of FIG. 1 using a password.

FIG. 2 is a flowchart of one embodiment showing a management method for a new and different password of the electronic device 1 of FIG. 1. Depending on the embodiment, additional steps may be added, others removed, and the ordering of the steps may be changed.

In step S1, the setting module 101 sets one or more formulas for generating dynamic passwords to unlock the electronic device 1, and writes the one or more formulas into a configuration file prestored in the storage unit 11. In the embodiment, the positional coordinates of the electronic device 1 are used as reference variables for the one or more formulas for generating different passwords. A correct password unlocks the electronic device 1 when the electronic device 1 is in a standby mode. In the embodiment, the standby mode refers to a low power mode for the electronic device 1 when the display 14 is locked.

In the embodiment, the one or more formulas are preset by a user of the electronic device 1. In an example, one formula may be, for example, $f(x)=(y+2)(x+6)$, $f(x)=xy$, $f(x)=mnx59$, or $f(x)=8(x+5)7y$, where x and y are reference variables for the formula. The x and y variables respectively represent the longitude data and the latitude data of the positional coordinates of the electronic device 1, and $f(x)$ represents a password for unlocking the electronic device 1. Accordingly, the password is created according to the current positional coordinates of the electronic device 1.

In step S2, the obtaining module 103 obtains current positional coordinates of the electronic device 1 from the positioning device 13 and displays the current positional coordinates of the electronic device 1 on the display 14 in real-time or at intervals.

In step S3, the management module 105 determines whether the position of the electronic device 1 changes, and generates a new password using the one or more formulas according to the current positional coordinates of the electronic device 1 when the position of the electronic device 1 changes, thus replacing a previous password of the electronic device 1. Step S3 may be executed at regular intervals, or in real-time, or when the user activates the electronic device 1 out of the standby mode.

In step S4, the verification module 107 verifies whether or not a password input by a user matches a current password stored in the storage unit 11 of the electronic device 1, and unlocks the electronic device 1 when the password input by the user does match.

When the password input by the user does not match the current password of the electronic device 1, the verification module 107 counts a number of times that the user inputs an incorrect password within a first predetermined time period, and then prevents the electronic device 1 from being unlocked within a second predetermined time period when the counted number of enter-password attempts exceeds a predetermined number, such as three or five attempts.

To further protect the data of the electronic device 1, the positioning device 13 and the electronic device 1 may be physically separated from each other. When the user needs to unlock the electronic device 1, the positioning device 13 is activated and communicates with the electronic device 1. The positioning device 13 detects and displays its own positional coordinates via a display (not shown) of the positioning device 13, and transmits its own positional coordinates to the electronic device 1. Thereupon, the password management system 10 may change the password of the electronic device 1 according to the received positional coordinates. The user must input the correct password according to the displayed positional coordinates on the positioning device 13 to unlock the electronic device 1.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for managing a password of an electronic device, comprising:
    setting one or more formulas for generating dynamic passwords to unlock the electronic device, and writing the one or more formulas into a configuration file prestored in the electronic device, the one or more formulas using positional coordinates of the electronic device as reference variables;
    obtaining current positional coordinates of the electronic device;
    determining whether a position of the electronic device changes;
    generating a first password using the one or more formulas according to the current positional coordinates of the electronic device when the position of the electronic device changes;
    verifying whether a password input by a user matches a current password of the electronic device; and
    unlocking the electronic device when the password input by the user matches the current password of the electronic device, wherein when the first password is generated, the first password becomes the current password of the electronic device, and the current password of the electronic device remains valid until a second password is generated using the one or more formulas when the position of the electronic device changes, and the second password differs from the first password; and the generating step further comprises:
    storing the second password in a storage unit of the electronic device where the first password is stored; and
    deleting the first password from the storage unit.

2. The method according to claim 1, further comprising:
    displaying the current positional coordinates of the electronic device on a display.

3. The method according to claim 1, further comprising:
counting a number of times that the electronic device receives an incorrect password input by the user within a first predetermined time period; and
preventing the electronic device from being unlocked within a second predetermined time period when the counted number of times exceeds a predetermined number of attempts.

4. The method according to claim 1, wherein the determining step is executed at intervals.

5. The method according to claim 1, wherein the determining step is executed in real-time.

6. The method according to claim 1, wherein the determining step is executed when the electronic device is activated out of a standby mode.

7. An electronic device, comprising:
a storage unit;
at least one processor; and
one or more programs stored in the storage unit and executed by the at least one processor, the one or more programs comprising:
a setting module setting one or more formulas for generating dynamic passwords to unlock the electronic device, and writing the one or more formulas into a configuration file prestored in the storage unit, the one or more formulas using positional coordinates of the electronic device as reference variables;
an obtaining module obtaining current positional coordinates of the electronic device;
a management module determining whether a position of the electronic device changes, generating a first password using the one or more formulas according to the current positional coordinates of the electronic device when the position of the electronic device changes; and
a verification module verifying whether a password input by a user matches a current password of the electronic device, and unlocking the electronic device when the password input by the user matches the current password of the electronic device;
wherein when the first password is generated, the first password becomes the current password of the electronic device, and the current password of the electronic device remains valid until a second password is generated using the one or more formulas when the position of the electronic device changes, and the second password differs from the first password; the management module further stores the second password in the storage unit where the first password is stored, and deletes the first password from the storage unit.

8. The electronic device according to claim 7, further comprising a positioning device wherein the positioning device calculates the positional coordinates of the electronic device, and the obtaining module obtains the current positional coordinates of the electronic device from the positioning device.

9. The electronic device according to claim 7, further comprising a display, wherein the display displays the current positional coordinates of the electronic device.

10. The electronic device according to claim 7, wherein the verification module further counts a number of times that the electronic device receives an incorrect password input by the user within a first predetermined time period, and prevents the electronic device from being unlocked within a second predetermined time period when the counted number of times exceeds a predetermined number of attempts.

11. The electronic device according to claim 7, wherein the management module is activated at regular intervals, or in real-time, or when the electronic device is activated out of a standby mode.

12. A non-transitory storage medium having stored thereon instructions that, when executed by at least one processor of an electronic device, cause the electronic device to perform a method for managing a password of the electronic device, the method comprising:
setting one or more formulas for generating dynamic passwords to unlock the electronic device, and writing the one or more formulas into a configuration file prestored in the electronic device, the one or more formulas using positional coordinates of the electronic device as reference variables;
obtaining current positional coordinates of the electronic device;
determining whether a position of the electronic device changes;
generating a first password using the one or more formulas according to the current positional coordinates of the electronic device when the position of the electronic device changes;
verifying whether a password input by a user matches a current password of the electronic device; and
unlocking the electronic device when the password input by the user matches the current password of the electronic device, wherein when the first password is generated, the first password becomes the current password of the electronic device, and the current password of the electronic device remains valid until a second password is generated using the one or more formulas when the position of the electronic device changes, and the second password differs from the first password; and the generating step further comprises:
storing the second password in a storage unit of the electronic device where the first password is stored; and
deleting the first password from the storage unit.

13. The non-transitory storage medium according to claim 12, wherein the method further comprises:
displaying the current positional coordinates of the electronic device on a display.

14. The non-transitory storage medium according to claim 12, wherein the method further comprises:
counting a number of times that the electronic device receives an incorrect password input by the user within a first predetermined time period; and
preventing the electronic device from being unlocked within a second predetermined time period when the counted number of times exceeds a predetermined number of attempts.

* * * * *